United States Patent
Aaron

(10) Patent No.: US 9,898,093 B2
(45) Date of Patent: *Feb. 20, 2018

(54) GESTURE CONTROL

(71) Applicant: AT&T Intellectual Property I, L.P., Atlanta, GA (US)

(72) Inventor: Jeffrey A. Aaron, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/468,178

(22) Filed: Mar. 24, 2017

(65) Prior Publication Data

US 2017/0192524 A1    Jul. 6, 2017

Related U.S. Application Data

(63) Continuation of application No. 15/078,317, filed on Mar. 23, 2016, now Pat. No. 9,639,169, which is a continuation of application No. 14/261,660, filed on Apr. 25, 2014, now Pat. No. 9,335,828, which is a continuation of application No. 11/699,227, filed on Jan. 29, 2007, now Pat. No. 8,736,420.

(51) Int. Cl.
*G05B 19/00* (2006.01)
*G06F 3/01* (2006.01)
*G08C 17/02* (2006.01)

(52) U.S. Cl.
CPC .............. *G06F 3/017* (2013.01); *G08C 17/02* (2013.01)

(58) Field of Classification Search
CPC ................................ G06F 3/017; G08C 17/02

USPC .................................................... 340/5.6, 5.1
See application file for complete search history.

(56) References Cited

U.S. PATENT DOCUMENTS

| | | | |
|---|---|---|---|
| 5,142,655 A | 8/1992 | Drumm | |
| 5,317,317 A | 5/1994 | Billaud et al. | |
| 5,426,666 A | 6/1995 | Kato | |
| 5,428,342 A * | 6/1995 | Enoki ............... | G08B 21/0423 340/12.32 |
| 5,554,980 A | 9/1996 | Hashimoto et al. | |
| 5,574,964 A | 11/1996 | Hamlin | |
| 5,704,836 A | 1/1998 | Norton | |
| 5,726,645 A | 3/1998 | Kamon et al. | |
| 5,734,371 A | 3/1998 | Kaplan | |
| 5,974,236 A | 10/1999 | Sherman | |
| 6,006,089 A | 12/1999 | Sasaki et al. | |
| 6,101,428 A | 8/2000 | Snyder | |
| 6,170,439 B1 * | 1/2001 | Duncan ............... | A01K 15/021 119/720 |
| 6,256,476 B1 | 7/2001 | Beamish et al. | |
| 6,259,912 B1 * | 7/2001 | Si ......................... | H04W 24/00 455/115.3 |
| 6,307,952 B1 | 10/2001 | Dietz | |
| 6,314,127 B1 | 11/2001 | Lynch et al. | |
| 6,316,710 B1 | 11/2001 | Lindemann | |
| 6,317,028 B1 | 11/2001 | Valiulis | |
| 6,380,642 B1 | 4/2002 | Buchner | |

(Continued)

*Primary Examiner* — Joseph Feild
*Assistant Examiner* — Rufus Point
(74) *Attorney, Agent, or Firm* — Scott P. Zimmerman, PLLC

(57) ABSTRACT

Gesture control uses electromagnetic power signatures. A signal is received and a power of the signal is determined. The power is associated to a command, and the command is executed in response to a gesture.

20 Claims, 9 Drawing Sheets

(56) References Cited

U.S. PATENT DOCUMENTS

| | | | |
|---|---|---|---|
| 6,494,225 B1 * | 12/2002 | Olewicz | F16K 7/045 137/1 |
| 6,636,763 B1 | 10/2003 | Junker et al. | |
| 6,747,632 B2 | 6/2004 | Howard | |
| 6,928,342 B2 | 8/2005 | Horst | |
| 6,952,198 B2 | 10/2005 | Hansen | |
| 6,957,021 B2 * | 10/2005 | Aronson | G01M 11/00 398/136 |
| 7,046,119 B2 | 5/2006 | Ghabra et al. | |
| 7,116,988 B2 | 10/2006 | Dietrich et al. | |
| 7,151,435 B2 | 12/2006 | Brackett et al. | |
| 7,173,604 B2 | 2/2007 | Marvit et al. | |
| 7,176,886 B2 | 2/2007 | Marvit et al. | |
| 7,180,501 B2 | 2/2007 | Marvit et al. | |
| 7,180,502 B2 | 2/2007 | Marvit et al. | |
| 7,224,980 B2 | 5/2007 | Hara | |
| RE39,677 E | 6/2007 | Chen et al. | |
| 7,248,151 B2 | 7/2007 | McCall | |
| 7,289,025 B2 | 10/2007 | Perez-Garcia et al. | |
| 7,365,736 B2 | 4/2008 | Marvit et al. | |
| 7,394,346 B2 | 7/2008 | Bodin | |
| 7,411,506 B2 | 8/2008 | Volpi et al. | |
| 7,492,367 B2 | 2/2009 | Mahajan et al. | |
| 7,570,167 B2 | 8/2009 | Fein et al. | |
| 7,594,611 B1 | 9/2009 | Arrington, III | |
| 7,657,763 B2 | 2/2010 | Nelson et al. | |
| 7,698,002 B2 | 4/2010 | Music et al. | |
| 7,868,874 B2 | 1/2011 | Reynolds | |
| 7,953,180 B2 * | 5/2011 | Matsuoka | H03F 1/0205 327/291 |
| 8,049,599 B2 * | 11/2011 | Sutardja | H05B 37/0254 315/291 |
| 2001/0043145 A1 | 11/2001 | Jacobson, Jr. | |
| 2002/0016673 A1 | 2/2002 | Flick | |
| 2002/0024422 A1 | 2/2002 | Turner et al. | |
| 2002/0024427 A1 | 2/2002 | Banas | |
| 2003/0023435 A1 | 1/2003 | Josephson | |
| 2003/0087660 A1 * | 5/2003 | Sendonaris | H04W 52/226 455/522 |
| 2003/0132974 A1 | 7/2003 | Bodin | |
| 2004/0068409 A1 | 4/2004 | Tanaka et al. | |
| 2004/0110481 A1 | 6/2004 | Navsariwala | |
| 2004/0155792 A1 | 8/2004 | Joyner et al. | |
| 2004/0164875 A1 | 8/2004 | Dischert | |
| 2005/0024228 A1 | 2/2005 | Vignon et al. | |
| 2005/0110639 A1 | 5/2005 | Puzio et al. | |
| 2005/0125837 A1 | 6/2005 | Farmer et al. | |
| 2005/0143961 A1 * | 6/2005 | Lin | G01R 21/133 702/190 |
| 2005/0212767 A1 | 9/2005 | Marvit et al. | |
| 2005/0225453 A1 | 10/2005 | Chang | |
| 2005/0237295 A1 | 10/2005 | Anderson | |
| 2005/0258936 A1 * | 11/2005 | Ghabra | B60R 25/245 340/5.72 |
| 2006/0019679 A1 | 1/2006 | Rappaport et al. | |
| 2006/0031786 A1 * | 2/2006 | Hillis | G06F 3/04883 715/863 |
| 2006/0071753 A1 | 4/2006 | Lamar | |
| 2006/0091997 A1 | 5/2006 | Conner et al. | |
| 2006/0092040 A1 | 5/2006 | Fishkin | |
| 2006/0103503 A1 | 5/2006 | Rodriguez | |
| 2006/0187196 A1 | 8/2006 | Underkoffler | |
| 2006/0235633 A1 * | 10/2006 | Simons | G01R 29/0892 702/65 |
| 2006/0235805 A1 | 10/2006 | Peng et al. | |
| 2006/0246841 A1 | 11/2006 | Dennis et al. | |
| 2006/0271214 A1 | 11/2006 | Brown | |
| 2007/0046832 A1 | 3/2007 | Kim | |
| 2007/0105582 A1 * | 5/2007 | McCorkle | H04W 52/38 455/522 |
| 2007/0146118 A1 | 6/2007 | Rodriguez et al. | |
| 2007/0156618 A1 * | 7/2007 | Meurs | G06F 3/0237 706/47 |
| 2007/0279241 A1 | 12/2007 | Jung et al. | |
| 2008/0005351 A1 | 1/2008 | Neugebauer et al. | |
| 2008/0065235 A1 | 3/2008 | Igoe et al. | |
| 2008/0114615 A1 | 5/2008 | Mahesh et al. | |
| 2008/0154576 A1 * | 6/2008 | Wu | G06F 3/018 704/2 |
| 2008/0169929 A1 | 7/2008 | Albertson et al. | |
| 2009/0213134 A1 | 8/2009 | Stephanick et al. | |
| 2009/0262074 A1 | 10/2009 | Nasiri et al. | |
| 2009/0296959 A1 | 12/2009 | Bongiovi | |

* cited by examiner

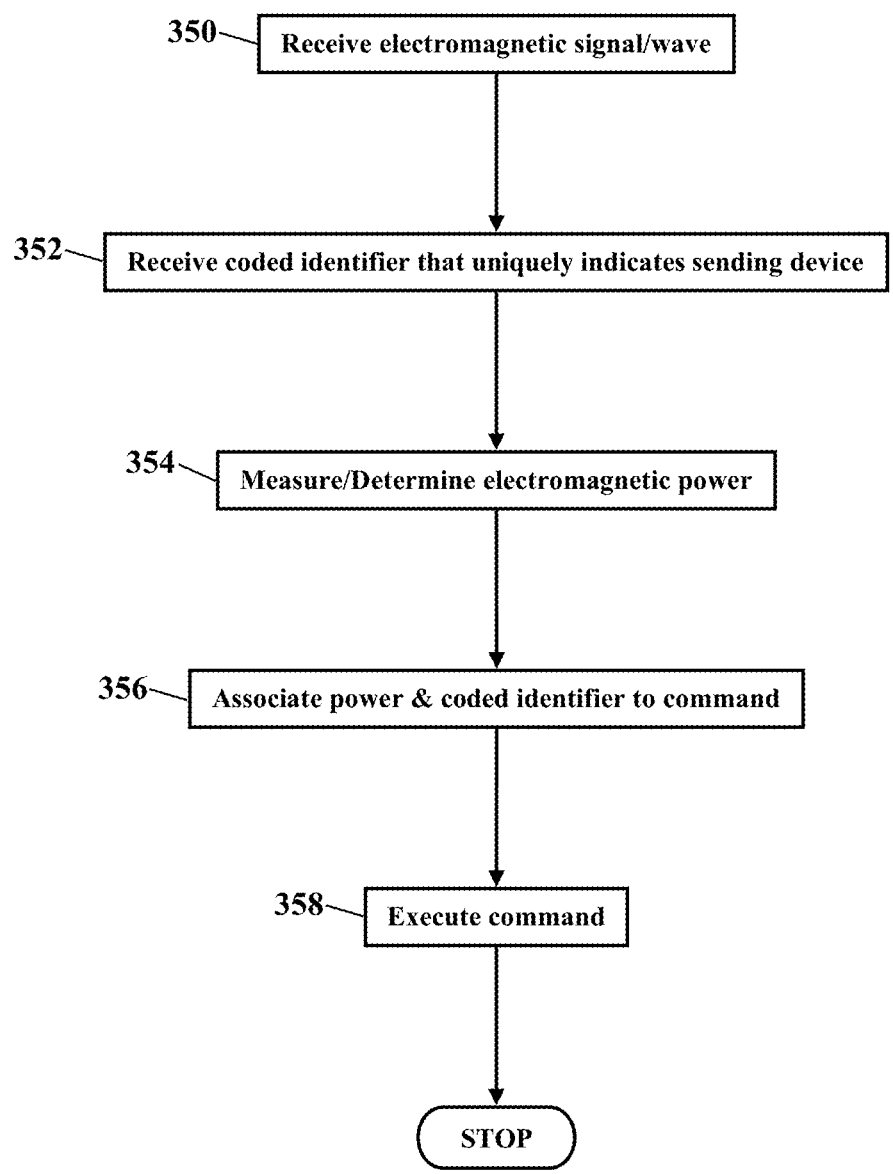

GESTURE CONTROL

CROSS-REFERENCE TO RELATED APPLICATIONS

This application is a continuation of U.S. application Ser. No. 15/078,317 filed Mar. 23, 2016 and since issued as U.S. Pat. No. 9,639,169, which is a continuation of U.S. application Ser. No. 14/261,660 filed Apr. 25, 2014 and since issued as U.S. Pat. No. 9,335,828, which is a continuation of U.S. application Ser. No. 11/699,227 filed Jan. 29, 2007 and since issued as U.S. Pat. No. 8,736,420, with all applications incorporated herein by reference in their entireties.

BACKGROUND

The exemplary embodiments generally relate to data processing and to computer processing and, more particularly, to gesture-based user interfaces.

User interfaces need improvement. Conventional user interfaces include a keypad, a control panel, a tactile mouse, a touch screen, and a graphical presentation (or GUI). All these conventional user interfaces require dexterity and hand-eye coordination that many people lack. Many users, for example, have trouble correctly pushing buttons on a phone's keypad. Many users lack the dexterity to depress a button on a mouse. Some users cannot adequately see small font sizes on a GUI. Even if a user possesses adequate dexterity and coordination, the user interface may be so cumbersome that some features are never accessed. What is needed, then, are methods, systems, and products for controlling devices that utilize an improved paradigm in user interfaces.

SUMMARY

The exemplary embodiments provide methods, systems, and products for controlling devices using a gesture-based user interface. Exemplary embodiments allow a user to make movements, or gestures, with a controlling device. As the user performs the gesture, the controlling device sends an electromagnetic signal or wave to a controlled device. As the electromagnetic signal or wave is received, the controlled device measures or determines the power transported by the electromagnetic signal or wave. That power is then associated with a command.

Exemplary embodiments thus allow the user to associate gestures to commands. As the user performs the gesture, the electromagnetic power of the received electromagnetic signal or wave changes with the movement of the gesture. Those changes in power may then be associated to commands. Exemplary embodiments thus permit the user to control any receiving device using gestures. The user, for example, may make a circular motion to cause an increase in volume of a television. As the user drives in a car, the user may perform hand gestures that causes channel changes on a radio. Exemplary embodiments may even utilize transponder technology that allows everyday items to control other devices. Whenever the user performs a recognized gesture, exemplary embodiments execute the command that is associated with that gesture.

Exemplary embodiments include a method for controlling a device. A signal is received and a power of the signal is determined. The power and/or the change in power verses time is associated to a command, and the command is executed.

More exemplary embodiments include a system for controlling a device. The system is operative to receive a signal and determine a power of the signal. The power and/or the change in power verses time is associated to a command, and the command is executed.

Other exemplary embodiments describe a computer program product for controlling a device. The computer program product stores instructions for receiving a signal and determining a power of the signal. The power is associated to a command, and the command is executed.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIG. 9 is a flowchart illustrating yet another method of controlling a device, according to more exemplary embodiments.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
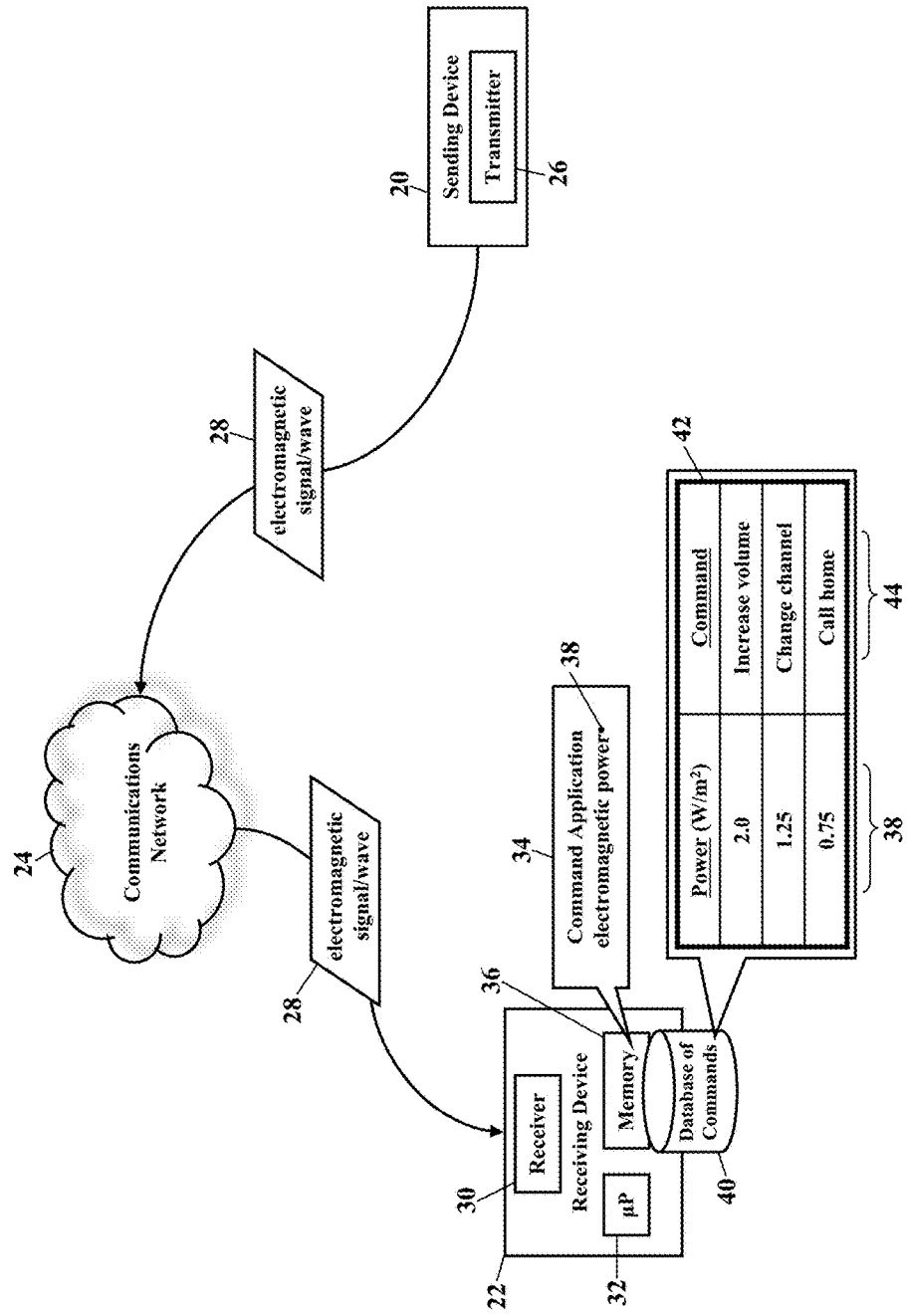
FIG. 1 is a schematic illustrating an environment in which exemplary embodiments may be implemented.

FIG. 1 is a schematic illustrating an environment in which exemplary embodiments may be implemented. A sending device 20 communicates with a receiving device 22 via a communications network 24. The sending device 20 has a transmitter 26 that sends an electromagnetic signal or wave 28 to the receiving device 22. The receiving device 22 has a receiver 30 that receives the electromagnetic signal or wave 28. A processor 32 (e.g., "μP"), application specific integrated circuit (ASIC), or other similar device couples to the receiver 30 and executes a command application 34 stored in memory 36. According to exemplary embodiments, the command application 34 is a set of processor-executable instructions that provide a gesture-based user interface. The command application 34 determines or measures electromagnetic power 38 carried by the electromagnetic signal or wave 28. As FIG. 1 illustrates, the command application 34 may then query a database 40 of commands. The database 40 of commands is illustrated as being locally stored in the memory 36 of the receiving device 22, yet the database 40 of commands may be remotely accessible via the communications network 24. The database 40 of commands is illustrated as a table 42 that maps, relates, or otherwise associates the electromagnetic power 38 to one or more commands 44. Each command 44 may be any instruction, rule, or control that is selected based on the energy transported by electromagnetic signal or wave 28. Based on the electromagnetic power 38 carried by the electromagnetic signal or wave 38, the command application 34 retrieves at least one command 44 from the database 40 of commands and instructs the processor 32 to execute the command 44.

According to exemplary embodiments, the command application 34 determines the electromagnetic power 38 carried by the electromagnetic signal or wave 28. As the electromagnetic signal or wave 28 travels or propagates, the electromagnetic signal or wave 28 carries electromagnetic power. The sending device 20 transfers energy to the receiving device 22 by emitting the electromagnetic signal or wave 28. When the receiver 30 receives the electromagnetic signal or wave 28, the command application 34 determines the amount of energy carried by the electromagnetic signal or wave 28. The command application 34, for example, may measure any value of the electromagnetic power, such as received power, instantaneous power, average power, and/or integrated over a time interval. The received power may be received and/or measured in any units, such as milliwatts or dBm (decibels referenced to one milliwatt=0 dBm). The command application 34 may additionally or alternatively utilize the Poynting vector to determine a power density vector associated with the electromagnetic signal or wave 28. The command application 34 may use an instantaneous expression of the Poynting vector to obtain an instantaneous value of the power transported in the electromagnetic signal or wave 28. The command application 34 may use a time-average Poynting vector to obtain an average value of the power transported in the electromagnetic signal or wave 28. The Poynting vector, however, is well-known to those of ordinary skill in the art and need not be fully explained. If the reader desires a further explanation, the reader is invited to consult DAVID K. CHENG, FIELD AND WAVE ELECTROMAGNETICS, and incorporated herein by reference.

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 2:
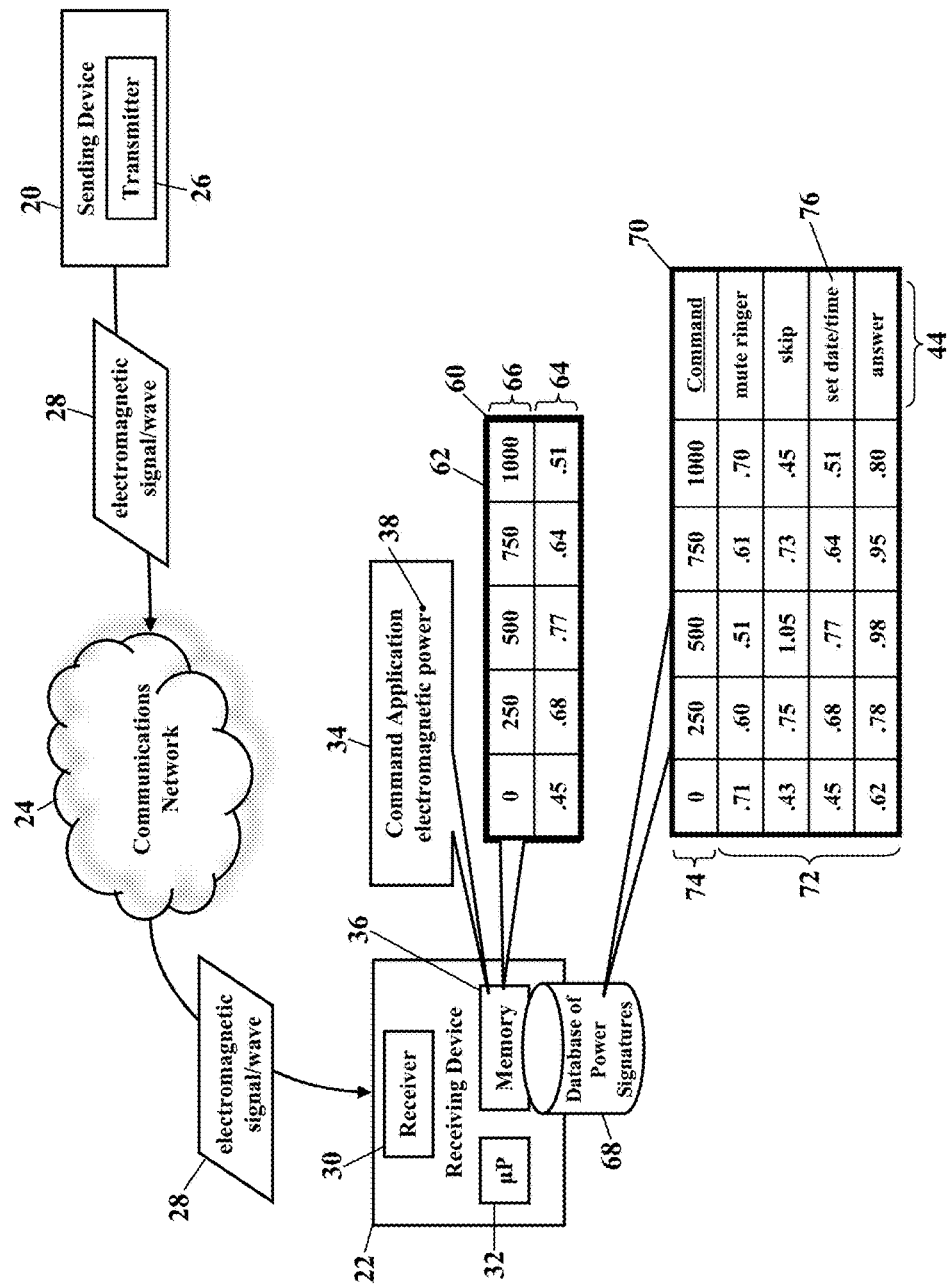
FIG. 2 is a schematic illustrating gesture-based controls, according to more exemplary embodiments.

FIG. 2 is a schematic illustrating gesture-based controls, according to more exemplary embodiments. Here, when a user moves the sending device 20, the command application 34 associates the changes in the electromagnetic power 38 to commands. As those of ordinary skill in the art understand, as the user moves the sending device 20, the electromagnetic power 38 of the received electromagnetic signal or wave 28 changes with that movement. Those changes in power may then be associated to commands. Exemplary embodiments thus permit the user to control the receiving device 22 using gestures. When the user moves the sending device 20 during a gesture, the power changes during that gesture may be related to commands. As the electromagnetic signal or wave 28 is received during the gesture, the command application 34 continuously or recursively measures the electromagnetic power 38 of the received electromagnetic signal or wave 28. The command application 34, for example, may measure the instantaneous or average power of the electromagnetic signal or wave 28 over time, for instance as a sequence of discrete measurements, each of which may be measurements of instantaneous power or average power obtained using an averaging/integration time interval. The command application 34 then retrieves a command that is associated with those changes in power over time.

FIG. 2, for example, illustrates a power signature 60. The power signature 60 is illustrated as a table 62 that associates power measurements 64 (in, for example, dBm, or decibels relative to a one milliwatt reference) for increments of time 66 (in, for example, milliseconds). As the sending device 20 transmits the electromagnetic signal or wave 28 during a gesture, the command application 34 may continuously or recursively measure the electromagnetic power 38 of the received electromagnetic signal or wave 28. According to exemplary embodiments, the command application 34 populates the table 62 and stores those power measurements 64 over the time 66 in the memory 36. The command application 34 then queries a database 68 of power signatures. The database 68 of power signatures is illustrated as being locally stored in the memory 36 of the receiving device 22, yet the database 68 of power signatures may be remotely accessible via the communications network 24. The database 68 of power signatures associates different patterns or power signatures to different commands. That is, the database 68 of power signatures stores a library or table 70 of power measurements 72 over time 74. Those power measurements 72 are also associated with the commands 44. The command application 34 retrieves the command 44 that corresponds to the power signature 60 and executes the command 44. In this example, the power signature 60 corresponds to a "set date/time" command 76. The user has performed a gesture that instructs the command application 34 to set the date and time of the receiving device 22.

Predetermined increments of time may be used to measure the electromagnetic power 38 of the received electromagnetic signal or wave 28. As the electromagnetic signal or wave 28 is received during a gesture, the command application 34 continuously or recursively measures the electromagnetic power 38 of the received electromagnetic signal or wave 28. While the command application 34 may use any increments of time in which to measure power, the command application 34 may use uniform or constant increments of time. The power signature 60, for example, is illustrated in increment of tenths of seconds. Because the user may use gestures to control the receiving device 22, most gestures may be one second (1 sec.) or less in duration. Every 250 milliseconds, then, the command application 34 may measure the electromagnetic power and obtain five (5) power measurements. These five power measurements may be ample data to distinguish one gesture from another gesture. Or, in other words, these five power measurements may be ample data to distinguish one power signature from another power signature. The command application 34, however, may be configured to measure electromagnetic power in any increments the user or designer desires, such as nanoseconds, microseconds, or milliseconds. A greater number of measurements, however, may require a greater amount of memory in which to store the data. A greater number of measurements may also slow the time required to interpret each gesture and to execute the corresponding command.

The receiving device 22 may be preloaded with power signatures. Before the command application 34 may retrieve a command associated with a power signature, the database 68 of power signatures may be populated with power signatures that correspond to gestures and to the desired command(s). A software developer of the command application 34, and/or a manufacturer of the receiving device 22, may preload power signatures and their corresponding commands. The user of the receiving device 22 may then learn and replicate the gestures from an instruction booklet, video, or online tutorial. The preloaded power signatures may be statistically based on an average user's range of motion, arm length, aptitude, and other factors. Gestures may also be based on confidence levels, such that the gestures (and thus power signatures) may be performed by a high percentage of users.

The command application 34 may have a learning mode of operation. Some users may wish to develop their own gestures and the corresponding commands. The command application 34, then, may have a mode of operation in which the user may register or teach gestures and associate those gestures to commands. When the command application 34 is in this learning mode of operation, the user may perform the desired gesture. The command application 34 measures the electromagnetic power of the received electromagnetic signal or wave, such as the signal or wave 28, and stores those measurements in the database 68 of power signatures. The command application 34 may even require that the user repetitively perform the gesture, thus allowing the command application 34 to make repetitive power measurements. The stored power signature may then represent an average value of power measurement. The command application 34 may also require a known motion, movement, or even sound that indicates the gesture is complete. The user, for example, may be required to "wiggle" the sending device 20 to indicate the gesture is complete. The user may alternatively or additionally access a user interface (such as a GUI, keypad, or control panel) and make inputs that indicate the gesture is complete. The sending device 20 and/or the receiving device 22 may even include a voice recognition component that is capable of receiving an audible command from a user indicating that the gesture is complete.

The command application 34 may also implement power ranges. As the user performs a gesture, that gesture may not exactly conform to a reference gesture. The user may not fully extend an arm, or the user may perform an oval motion instead of a full circular motion. Whatever the cause, the command application 34 may see variations in power measurements due to variations in gestures. The database 68 of power signatures, then, may store ranges of power measurements. The user may configure the command application 34 such that variations in the power measurements still result in recognition.

Electromagnetic power, whether received or measured, may be expressed in any units. Electromagnetic power, for example, may be expressed and manipulated using any suitable units, such as, but not limited to, dBm, dBW, milliwatts, Watts, or Watts/$m^2$. Relative power signatures may also be formulated and used as well, for instance by normalizing power and/or received power measurements to the starting or ending measurement value, or to an average of the measurements taken for a gesture. Exemplary embodiments may develop relative and/or normalized signatures using differences and/or ratios with respect to a normalized value, and these signatures have the advantage of making the signature independent of the range between the transmitter 26 and receiver 30. According to exemplary embodiments, using relative/normalized signatures allows the same signature to be used for a gesture, such as a user moving his/her hand in a circle, regardless of whether the user performs the gesture close to his/her waist or further out with his/her arm. Further, each measurement in a sequence can be an instantaneous measurement or an averaged measurement. That is, one can average over a long time period (e.g., the entire gesture), a medium time period (e.g., each fifth of a gesture), or a brief time period (e.g., two milliseconds). Power measurements, even when considered virtually instantaneous, may be averaged over brief time periods such as on the order of a millisecond in order to reduce aberrations/inaccuracies introduced by noise effects, in particular impulse noise. Thus, a power signature may be composed of or based on any of the above-described calculations, and a power signature may be configured to contain a mixture of values which contain different averaging/integration time intervals, or may contain a mixture of some instantaneous values and some averaged values, for instance in the case of the receiver 30 adapting its operation to the changing noise environment.

Figure 3:
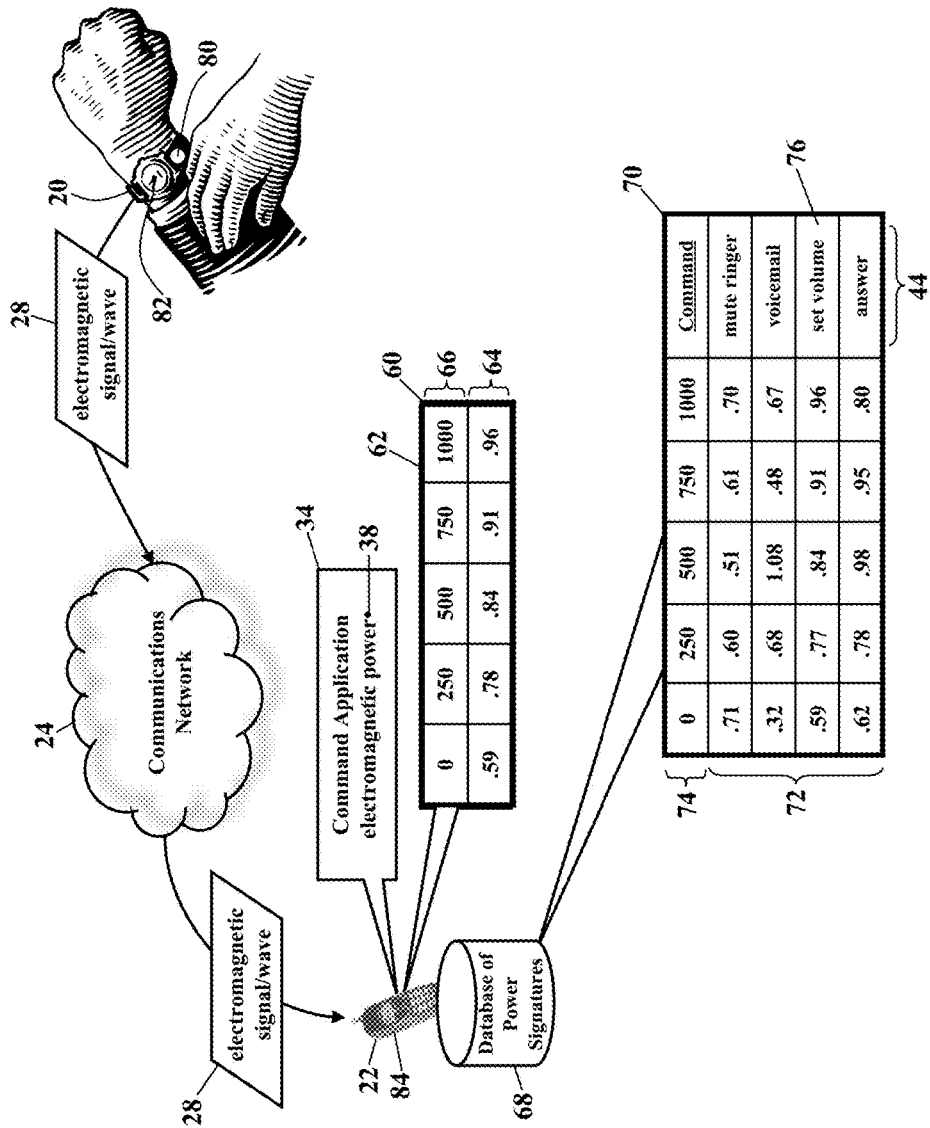
FIG. 3 is a schematic illustrating an RFID implementation, according to even more exemplary embodiments.

FIG. 3 is a schematic illustrating an RFID implementation, according to even more exemplary embodiments. Here the sending device 20 includes or incorporates a transponder 80. The sending device 20 is illustrated as a watch 82, and the transponder 80 is attached to or incorporated in the watch 82. The receiving device 22 is illustrated as a wireless phone 84. When the transponder 80 is activated, the transponder 80 wirelessly transmits the electromagnetic signal or wave 28. The transponder 80, for example, may be an RFID "tag" that uses the radio frequency portion of the electromagnetic spectrum, yet the transponder 80 may use any other frequency. When the wireless phone 84 receives the electromagnetic signal or wave 28, the command application 34 measures the electromagnetic power 38 transported by the electromagnetic signal or wave 28. The command application 34 then executes the command 44 that is associated with the electromagnetic power 38. If the watch 82 moves (as during a gesture), the command application 34 measures the electromagnetic power 38 over time and queries the database 68 of power signatures for the command 44. The database 68 of power signatures is illustrated as being locally stored in the wireless phone 84, yet the database 68 of power signatures may be remotely accessible via the communications network 24.

Exemplary embodiments, then, permit gesture-based control of the wireless phone 84. When the user wears the watch 82, the user may make gestures with the watch 82 to control the wireless phone 84. The user, for example, may perform a gesture to select the volume of the wireless phone 84. The command application 34 measures the electromagnetic power 38 of the electromagnetic signal or wave 28 emitted by the transponder 80. The command application 34 recognizes the power signature 60 of the gesture and executes the corresponding command 76 to control the volume. The command application 34 may activate a sound circuit to produce an audible "beep" that acknowledges the command. Other gestures may select ring tones, initiate calls, or configure the wireless phone 84. A gesture, for example, may command the wireless phone 84 to dial an emergency number (such as 911), thus permitting the user to obtain help without physically gaining access to the wireless phone 84.

Figure 4:
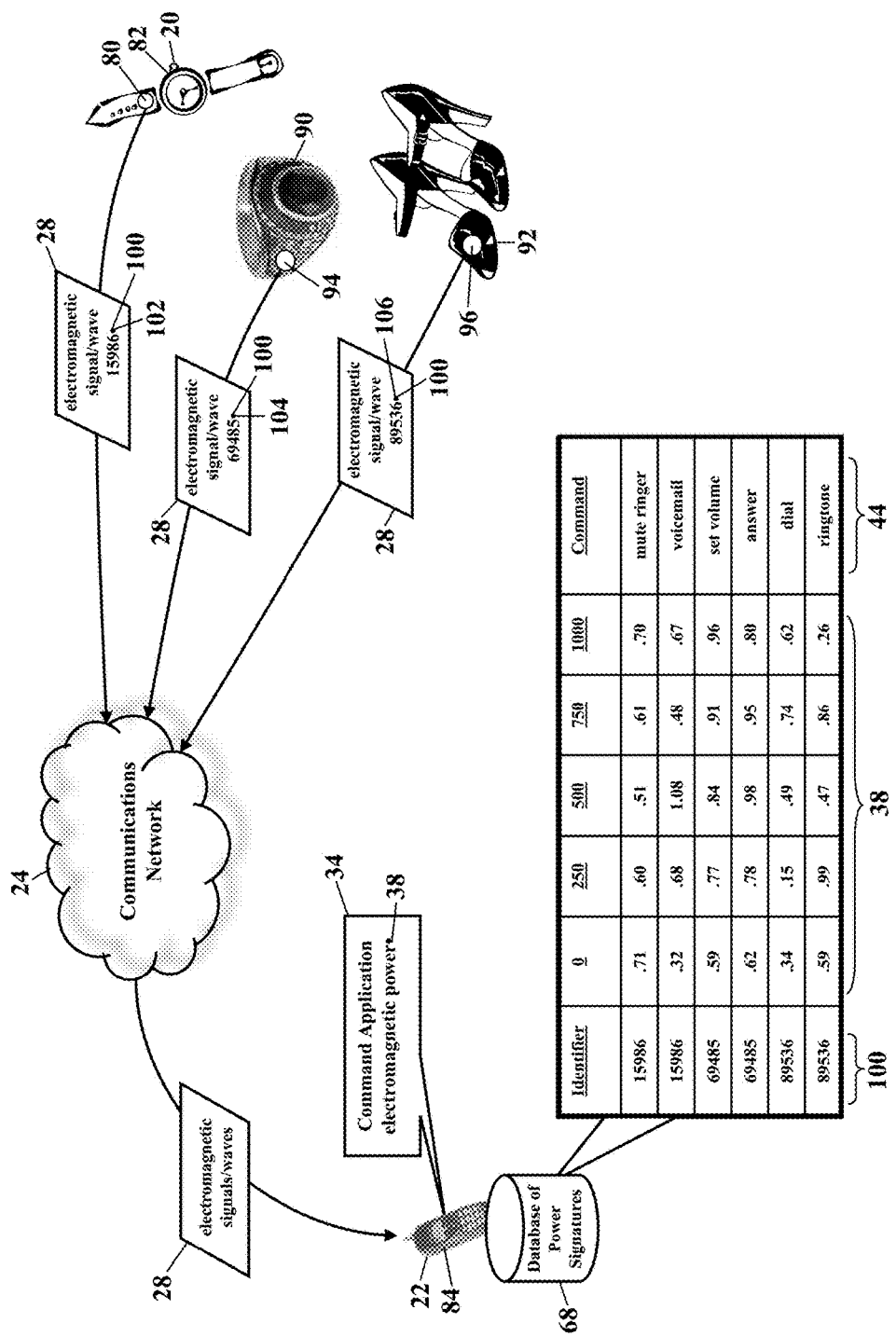
FIG. 4 is a schematic illustrating another RFID implementation, according to still more exemplary embodiments.

FIG. 4 is another schematic illustrating an RFID implementation, according to still more exemplary embodiments. Here multiple transponders may be used to control the wireless phone 84. As FIG. 4 illustrates, the wireless phone 84 may execute commands that are initiated by the watch 82, a ring 90, and a shoe 92. The watch 82, as before, incorporates the transponder 80. The ring 90 includes a second transponder 94, and the shoe 92 incorporates a third transponder 96. When any of the watch 82, the ring 90, and/or the shoe 92 is activated, their corresponding transponders 80, 94, and 96 emit corresponding electromagnetic signals or waves. According to exemplary embodiments, each transponder 80, 94, and 96, however, also transmits a coded identifier 100 that uniquely identifies the sending device. The coded identifier 100 is any alphanumeric string or combination that differentiates one transponder from another transponder. The watch 82, for example, sends a watch identifier 102 that uniquely identifies the electromagnetic signal or wave 28 transmitted by the transponder 80. The second transponder 94 sends a ring identifier 104 that uniquely identifies the electromagnetic signal or wave 28 associated with the ring 90. The third transponder 96 sends a shoe identifier 106 that uniquely identifies the electromagnetic signal or wave 28 associated with the shoe 92. When the wireless phone 84 receives either the electromagnetic signal or wave 28, the command application 34 receives the coded identifier 100 and measures the electromagnetic power 38. The command application 34 then queries the database 68 of power signatures for the coded identifier 100 and for the power measurement(s) 38. The command application 34 thus retrieves the command 44 that is associated with the coded identifier 100 and with the power measurement(s) 38.

FIG. 4 thus illustrates how multiple transponders may be used to control the wireless phone 84. When the user makes a gesture involving any of the transponders 80, 94, and 96, the command application 34 interprets the corresponding power signature and executes the associated command 44. Movement of the shoe 92, and thus the third transponder 96, may correspond to dialing a friend's telephone number. Waiving a finger, and the corresponding movement of the ring 90 and the second transponder 94, may cause the wireless phone 84 to answer an incoming communication. The user may associate any number of gestures, involving any combination of the transponders 80, 94, and 96, to different commands. Exemplary embodiments thus permit the receiving device 22 (e.g., the wireless phone 84) to be controlled by multiple sending devices, when each of the sending devices has the unique coded identifier 100.

Each transponder 80, 94, and 96 may need to register. As transponders become cheaper, the day may come when nearly all items include at least one transponder. Shirts, pants, gloves, and other articles of clothing may include transponders. Rings, watches, and other jewelry may also include transponders. Appliances, tools, furniture, consumer electronics, and any other item may include one or more transponders. Each transponder, then, may need to register its unique identifier 100 with the command application 34. After a transponder registers, that transponder's power signature may then be used to control the receiving device 22. If a transponder is not registered, the command application 34 may or may not ignore its power signature.

Figure 5:
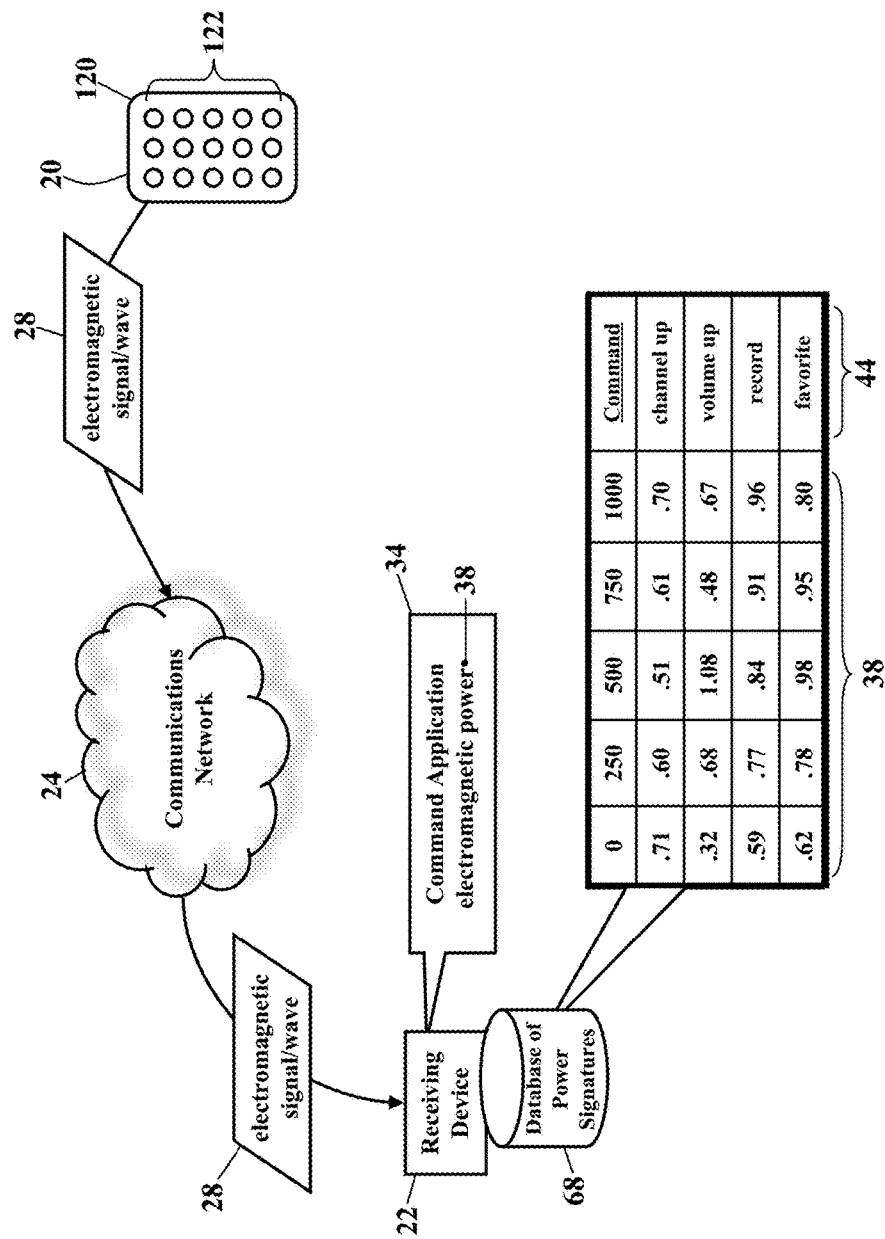
FIG. 5 is a schematic illustrating a remote control, according to more exemplary embodiments.

FIG. 5 is a schematic illustrating a remote control 120, according to more exemplary embodiments. Here the sending device 20 is the remote control 120 that wirelessly communicates with the receiving device 22 via the communications network 24. While the receiving device 22 is again generically shown, the receiving device 22 may be a television, set-top terminal, computer, audio equipment, or any other processor-controlled electronics device. While the remote control 120 may wirelessly communicate using any standard or frequency of the electromagnetic spectrum, the remote control 120 may commonly use the infrared band, the Industrial, Scientific, and Medical band, BLUETOOTH®, or any other the IEEE 802 family of standards. The remote control 120 sends the electromagnetic signal or wave 28 to the receiving device 22. A user of the remote control 120, for example, may depress or hold a button, or combination of buttons, on a keypad 122. That button depression causes the electromagnetic signal or wave 28 to be emitted. When the receiving device 22 receives the electromagnetic signal or wave 28, the command application 34 determines or measures the electromagnetic power 38 carried by the electromagnetic signal or wave 28. The command application 34 then queries the database 68 of power signatures for the command 44 associated with the measured electromagnetic power 38. The command application 34 retrieves the command 44 and executes the command 44.

Figure 6:
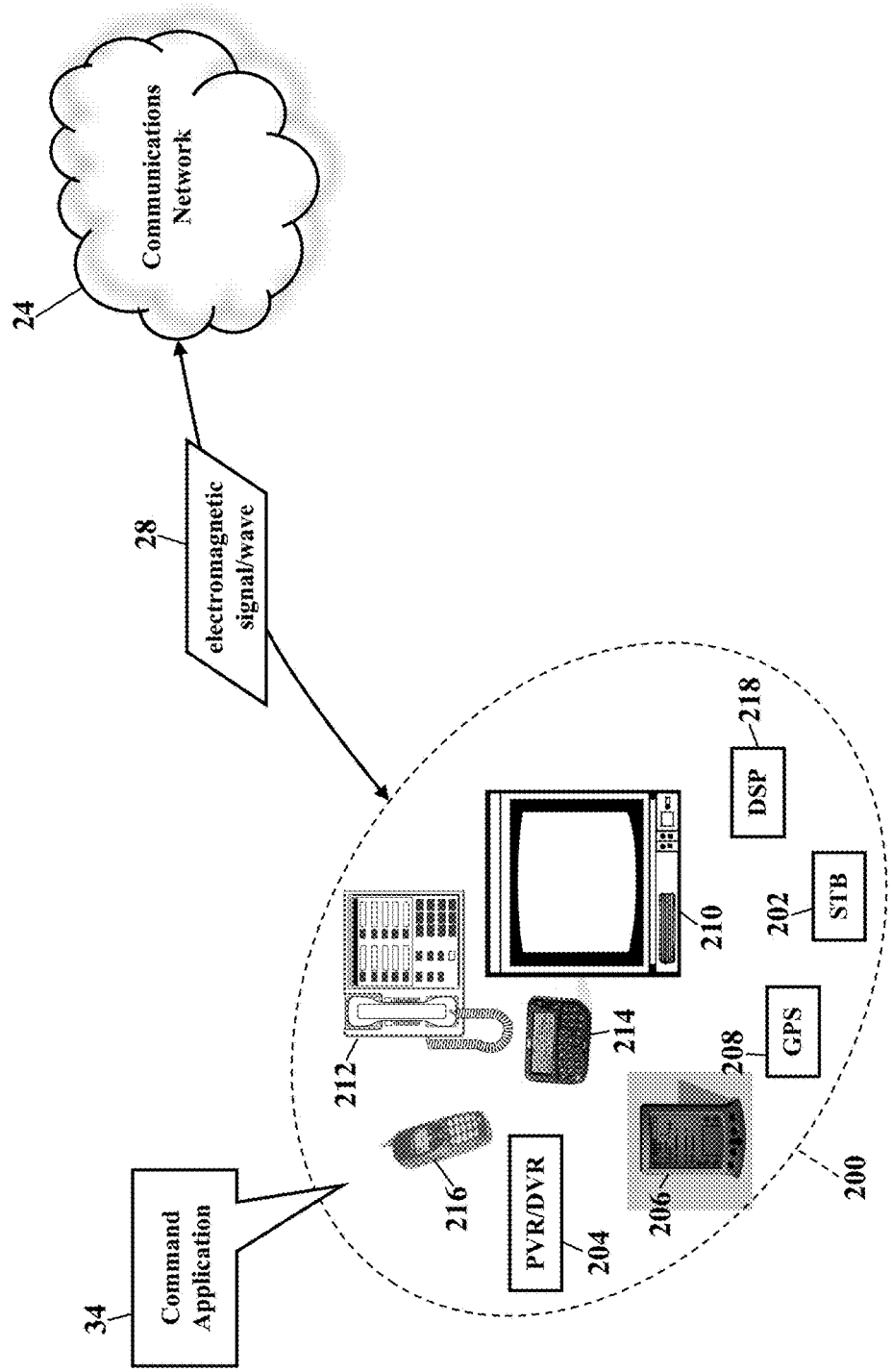
FIG. 6 depicts other possible operating environments for additional aspects of the exemplary embodiments.

FIG. 6 depicts other possible operating environments for additional aspects of the exemplary embodiments. FIG. 6 illustrates that the command application 34 may alternatively or additionally operate within various other devices 200. FIG. 6, for example, illustrates that the command application 34 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital signal processor (DSP) 218. The device 200 may also include watches, radios, vehicle electronics, clocks, printers, gateways, and other apparatuses and systems. Because the architecture and operating principles of the various devices 200 are well known, the hardware and software componentry of the various devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01)) "; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); EDWARD M. SCHWALB, ITV HANDBOOK: TECHNOLOGIES AND STANDARDS (2004); ANDREW TANENBAUM, COMPUTER NETWORKS (4$^{th}$ edition 2003); WILLIAM STALLINGS, COMPUTER ORGANIZATION AND ARCHITECTURE: DESIGNING FOR PERFORMANCE (7$^{th}$ Ed., 2005); and DAVID A. PATTERSON & JOHN L. HENNESSY, COMPUTER ORGANIZATION AND DESIGN: THE HARDWARE/SOFTWARE INTERFACE (3$^{rd}$. Edition 2004).

Figure 7:
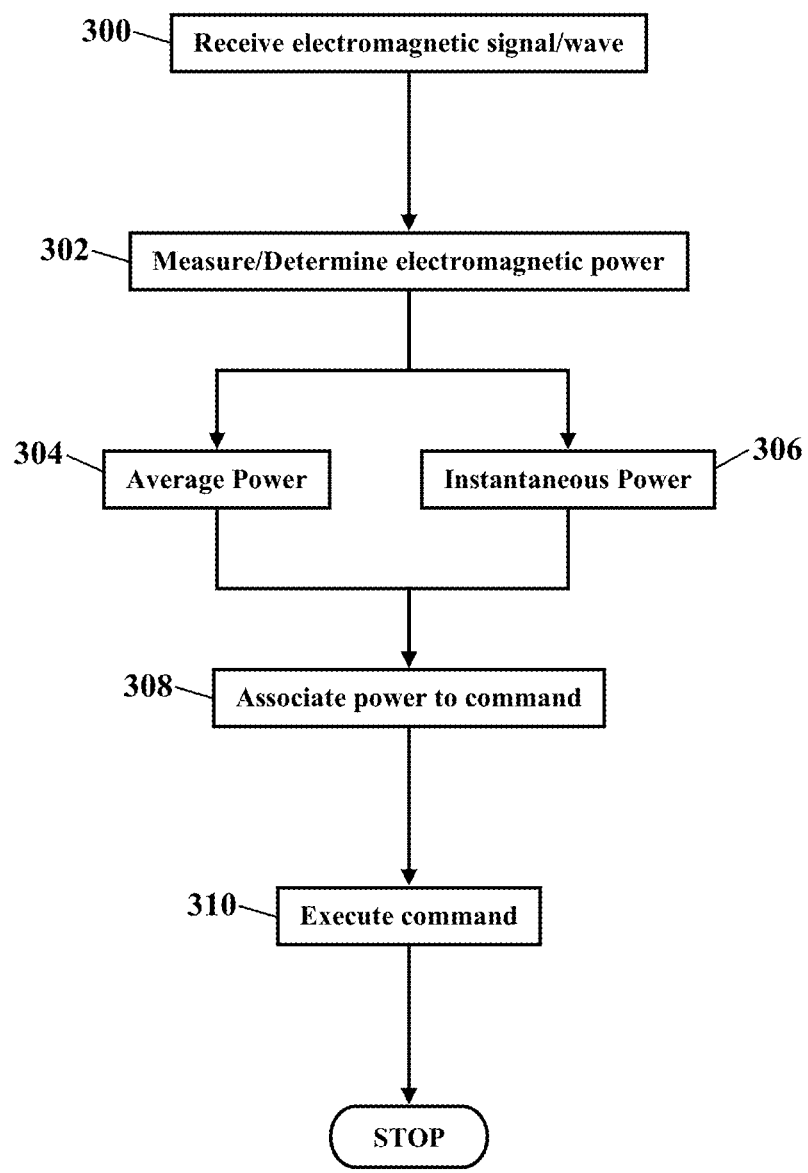
FIG. 7 is a flowchart illustrating a method of controlling a device, according to more exemplary embodiments.

FIG. 7 is a flowchart illustrating a method of controlling a device, according to more exemplary embodiments. A signal is received (Block 300) and the power of the signal is measured/determined (Block 302). The average power may be determined (Block 304) and/or the instantaneous power may be determined (Block 306). The power is associated to a command (Block 308) and the command is executed (Block 310).

Figure 8:
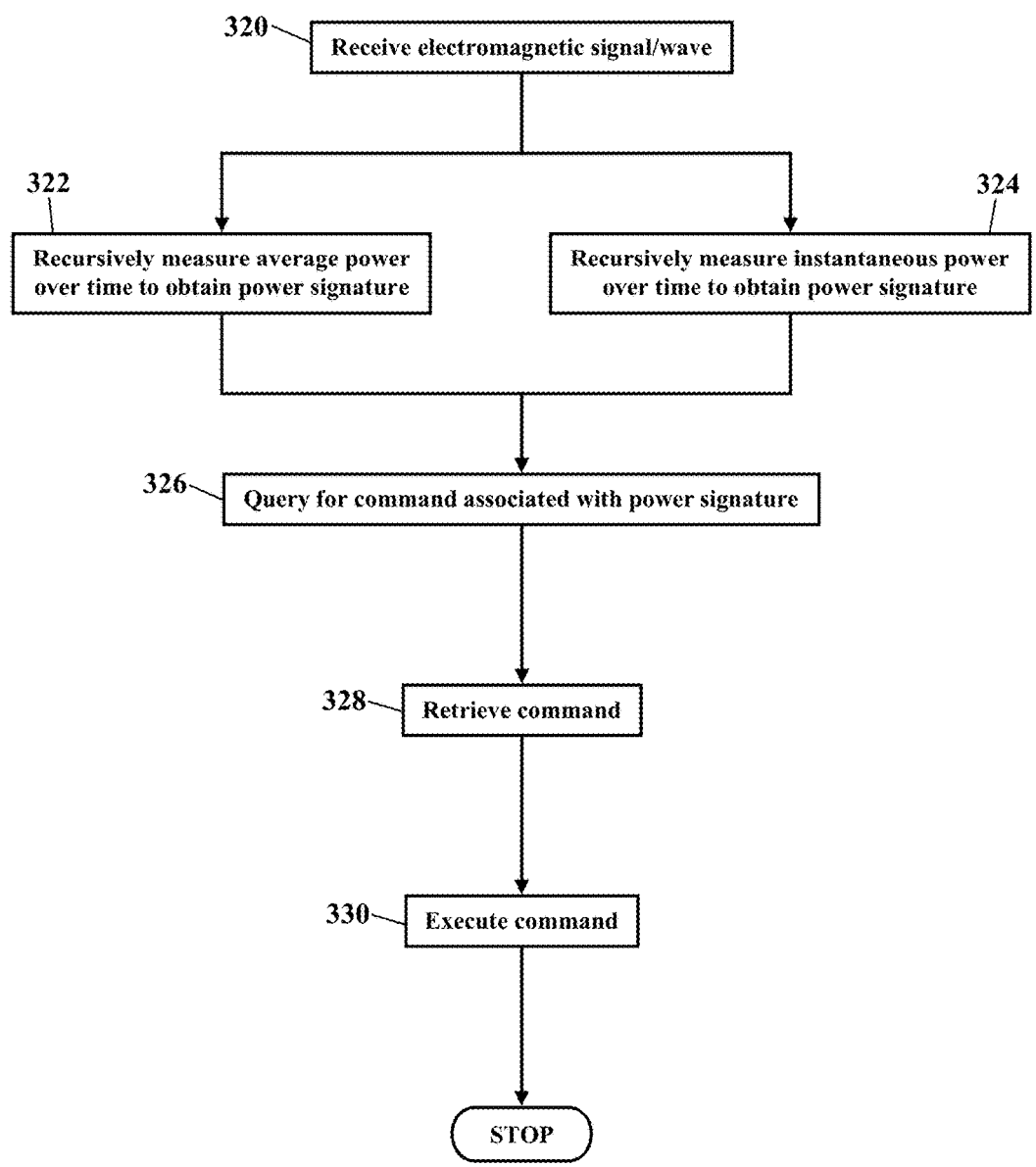
FIG. 8 is a flowchart illustrating another method of controlling a device, according to still more exemplary embodiments.

FIG. 8 is a flowchart illustrating another method of controlling a device, according to still more exemplary embodiments. A signal is received (Block 320). The average power of the signal may be recursively measured over time to obtain a power signature of the signal (Block 322). The instantaneous power of the signal may be recursively measured over time to obtain a power signature of the signal (Block 324). The power measurements, as earlier explained, may be normalized and/or averaged as a sequence of one or more values. A query is made for a command associated with the power signature (Block 326). The command is retrieved (Block 328) and executed (Block 330).

FIG. 9 is a flowchart illustrating yet another method of controlling a device, according to more exemplary embodiments. A signal is received (Block 350) and a coded identifier is also received (Block 352). The coded identifier uniquely indicates a sending device that transmitted the signal. The power of the signal is measured/determined (Block 354). The power and the coded identifier is associated to a command (Block 356) and the command is executed (Block 358).

Exemplary embodiments may measure voltage and/or current. When the receiving device 22 receives the electromagnetic signal or wave 28, exemplary embodiments may measure a voltage and/or current that is induced in a circuit by the electromagnetic signal or wave 28. A voltage signature, for example, describes voltage measurements over time. A current signature describes current measurements over time. Exemplary embodiments may query a database of voltage signatures and/or current signatures that associates signatures to commands. The corresponding command is retrieved and executed. As is well known, power P is mathematically determinable from current I and/or voltage V when resistance R is known, and determinable from the combination of I and V even when R is unknown, i.e. $P=I^2R=V^2/R=IV$.

Exemplary embodiments may be physically embodied on or in a computer-readable medium. This computer-readable medium may include CD-ROM, DVD, tape, cassette, floppy disk, memory card, flash drive, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments. A computer program product comprises processor-executable instructions for accessing commands that control devices.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
  receiving, by a controlled device, an electromagnetic signal from a controlling device;
  determining, by the controlled device, an electromagnetic power associated with the electromagnetic signal received from the controlling device;
  querying, by the controlled device, an electronic database for the electromagnetic power, the electronic database electronically associating commands to electromagnetic powers including the electromagnetic power associated with the electromagnetic signal;
  identifying, by the controlled device, a command of the commands in the electronic database that is electronically associated with the electromagnetic power; and
  executing, by the controlled device, the command in response to the receiving of the electromagnetic signal from the controlling device.

2. The method of claim 1, further comprising storing the electronic database.

3. The method of claim 1, further comprising measuring the electromagnetic power associated with the electromagnetic signal.

4. The method of claim 1, further comprising determining sequential values of the electromagnetic power associated with the electromagnetic signal.

5. The method of claim 1, further comprising receiving the electromagnetic power during a movement of the controlling device.

6. The method of claim 1, further comprising determining a change in the electromagnetic power.

7. The method of claim 1, further comprising determining a change over time in the electromagnetic power.

8. A system, comprising:
a hardware processor; and
a memory device, the memory device storing code, the code when executed causing the hardware processor to perform operations, the operations comprising:
receiving an electromagnetic signal from a controlling device;
determining an electromagnetic power associated with the electromagnetic signal received from the controlling device;
querying an electronic database for the electromagnetic power, the electronic database electronically associating commands to electromagnetic powers including the electromagnetic power associated with the electromagnetic signal;
identifying a command of the commands in the electronic database that is electronically associated with the electromagnetic power; and
executing the command in response to the receiving of the electromagnetic signal from the controlling device.

9. The system of claim 8, wherein the operations further comprise storing the electronic database.

10. The system of claim 8, wherein the operations further comprise measuring the electromagnetic power associated with the electromagnetic signal.

11. The system of claim 8, wherein the operations further comprise determining sequential values of the electromagnetic power associated with the electromagnetic signal.

12. The system of claim 8, wherein the operations further comprise determining a change in the electromagnetic power.

13. The system of claim 8, wherein the operations further comprise determining a change over time in the electromagnetic power.

14. The system of claim 8, wherein the operations further comprise determining the electromagnetic power during a movement of the controlling device.

15. A memory device storing code which when executed causes a hardware processor to perform operations, the operations comprising:
receiving an electromagnetic signal from a controlling device;
determining an electromagnetic power associated with the electromagnetic signal received from the controlling device;
querying an electronic database for the electromagnetic power, the electronic database electronically associating commands to electromagnetic powers including the electromagnetic power associated with the electromagnetic signal;
identifying a command of the commands in the electronic database that is electronically associated with the electromagnetic power; and
executing the command in response to the receiving of the electromagnetic signal from the controlling device.

16. The memory device of claim 15, wherein the operations further comprise storing the electronic database.

17. The memory device of claim 15, wherein the operations further comprise measuring the electromagnetic power associated with the electromagnetic signal.

18. The memory device of claim 15, wherein the operations further comprise determining sequential values of the electromagnetic power associated with the electromagnetic signal.

19. The memory device of claim 15, wherein the operations further comprise determining a change in the electromagnetic power.

20. The memory device of claim 15, wherein the operations further comprise determining a change over time in the electromagnetic power.

* * * * *